No. 853,968. PATENTED MAY 21, 1907.
J. T. GIRARD.
STEERING GEAR FOR VEHICLES.
APPLICATION FILED APR. 26, 1906.
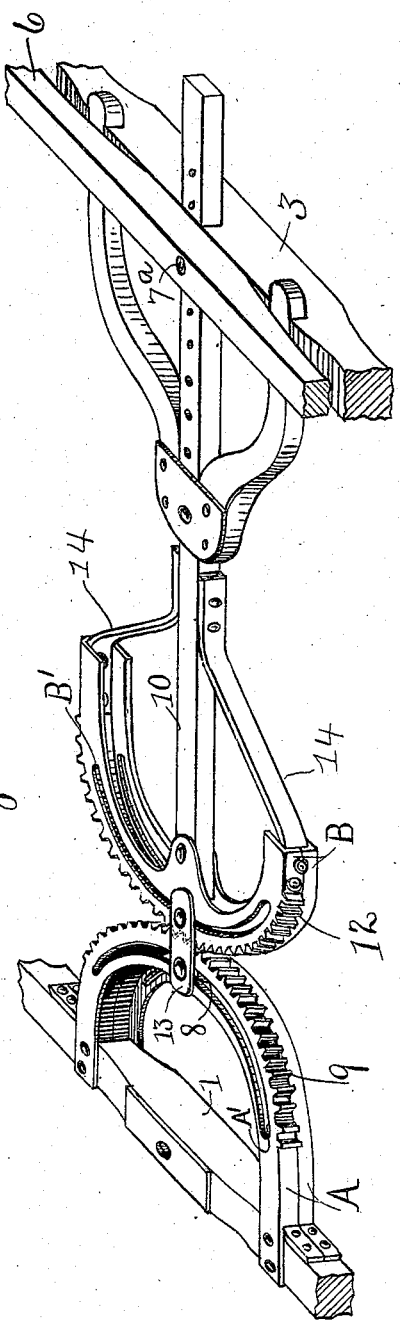
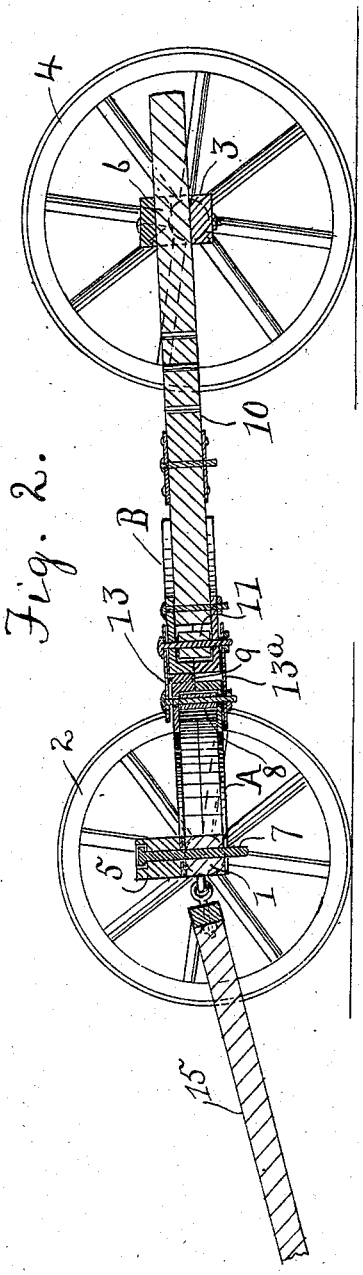
Witnesses:
By his Attorney
Inventor
Joseph T. Girard
James T. Watson

UNITED STATES PATENT OFFICE.

JOSEPH T. GIRARD, OF DEER RIVER, MINNESOTA.

STEERING-GEAR FOR VEHICLES.

No. 853,968.     Specification of Letters Patent.     Patented May 21, 1907.

Application filed April 26, 1906. Serial No. 313,770.

*To all whom it may concern:*

Be it known that I, JOSEPH T. GIRARD, a citizen of the United States, residing at Deer River, in the county of Itasca and State of Minnesota, have invented certain new and useful Improvements in Steering-Gear for Vehicles; and I do hereby declare the following to be a full, clear, and exact description of the invention, such as will enable others skilled in the art to which it appertains to make and use the same.

My invention relates to steering gear for vehicles, and has for its object the provision of simple and convenient means for automatically swinging the rear wheels in a direction at an angle to the direction of the front wheels where said front wheels are swung at an angle to the normal longitudinal axis of the vehicle.

It consists of the construction, combinations and arrangements of parts hereinafter described and claimed.

In the drawings, Figure 1, is a fragmentary perspective view of the frame of a vehicle embodying my invention, Fig. 2, is a central vertical longitudinal view of said vehicle.

In the drawings, 1 is the forward axle, forming part of the front running gear, upon which are mounted the wheels 2; and 3 is the rear axle, upon which are mounted the wheels 4, upon said forward axle is mounted a bolster 5, and upon said rear axle is mounted a bolster 6. A king pin 7 is directed through the forward bolster and axle, to effect a pivotal relation between said bolster and axle, and a king pin 7$^a$ is projected through the rear bolster and axle to effect a pivotal relation between the same. A vehicle box, not shown, may, if desired be mounted in any suitable or well known manner upon said bolsters.

Connected in any suitable manner with the forward axle is a segment A, preferably formed of two horizontally laid parts, comprising a vertically directed web and upper and lower inwardly directed flanges. Said flanges are slotted for a portion of their lengths, concentrically with said segments, as at A$^1$, for the passage of axle or reduced ends of a vertically disposed roller 8 which is positioned between said flanges and is adapted to rest upon the lower flange and bear against the inner face of said web. Formed upon or secured to the outer face of said web are teeth 9.

Connected in any suitable manner to the rear axle 3, as by means of the reach 10, is an oppositely or forwardly directed segment B, approximately similar in construction to the first said segment, the flanges of said segment, B, being slotted as at B$^1$ for the passage of the reduced ends or axle of the roller 11, and said segment B being provided with the teeth 12 meshing with the teeth 9. The segments are connected together indirectly by means of links or plates 13 and 13$^a$ loosely mounted on the reduced ends or axles of the rollers 8 and 11. Any suitable additional braces may be added to secure either or both of said segments to their supports, as the braces 14. The segments may also, if desired be covered with metallic aprons or shields of any suitable construction (not shown) to exclude dirt.

The invention is especially desirable in turning the vehicle around sharp corners or other obstacles.

In operation, when the front wheels or truck are turned, as by the pole 15, so as to travel to the right, the segment A acting on the segment B, swings the rear truck so that it will travel toward the left. The rollers 8 and 11 will at the same time travel partly around said segments and in coöperation with the plates 13 and 13$^a$ continue to hold the segments in engagement with each other. The front truck will not usually, however, in practice be turned at right angles to the normal longitudinal axis of the vehicle, since the result of the turning of the rear wheels in a horizontal plane is to make a longer turn of the front wheels usually sufficient, and it is thought that it will not be desirable to turn the front and rear wheels parallel with each other.

It is obvious that said invention may be applied to vehicles of various constructions and I do not therefore desire to be limited to its use with the exact form of vehicle illustrated nor to the exact herein illustrated method of attaching the invention to the vehicle; but the constructions shown may be modified in minor details without departing from the spirit and scope of my said invention.

What I claim is.

In a vehicle, the combination of a forward running gear a horizontal rearwardly directed toothed segment secured to said gear and embodying a web and upper and lower inwardly directed flanges, said flanges being slotted for a portion of their lengths in a plane parallel with said web, a rear running gear, a horizontal forwardly directed toothed segment secured to said rear running gear and embodying a web and upper and lower inwardly directed flanges, said flanges being slotted for a portion of their lengths in a plane parallel with said web, the teeth of said segments meshing with each other, vertically disposed rollers positioned between said flanges, and plates or links extending over said slots and pivotally connected at one end to one of said rollers and pivotally connected at the opposite end to the other of said rollers.

In testimony whereof I hereunto affix my signature, in presence of two witnesses.

JOSEPH T. GIRARD.

Witnesses:
  JAMES T. WATSON,
  A. M. AMS.